US008861705B1

(12) United States Patent
Asghari et al.

(10) Patent No.: US 8,861,705 B1
(45) Date of Patent: Oct. 14, 2014

(54) PRIORITY QUEUING IN A NEXT GENERATION COMMUNICATION NETWORK

(75) Inventors: Abdolreza Asghari, Santa Clara, CA (US); ShouJei Cheng, Fremont, CA (US); James D. Kirby, San Mateo, CA (US); Dominick Mangiardi, Fremont, CA (US); Jonathan E. Schaff, San Leandro, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1031 days.

(21) Appl. No.: 12/372,769

(22) Filed: Feb. 18, 2009

(51) Int. Cl.
H04M 3/42 (2006.01)
H04B 7/00 (2006.01)

(52) U.S. Cl.
USPC ..................................... 379/208.01; 455/527

(58) Field of Classification Search
USPC ................ 379/208.01, 209.01; 455/509, 527
See application file for complete search history.

(56) References Cited

U.S. PATENT DOCUMENTS

| 6,321,093 | B1 | 11/2001 | Dalal |
| 6,484,145 | B1 | 11/2002 | Home et al. |
| 6,985,740 | B2 | 1/2006 | Shyy et al. |
| 7,113,787 | B2 | 9/2006 | Chambers et al. |
| 2007/0149203 | A1 | 6/2007 | Sliva |
| 2008/0267376 | A1* | 10/2008 | Khasnabish ............ 379/201.01 |

OTHER PUBLICATIONS

"National Security/Emergency Preparedness (NS/EP)—Internet Protocol (IP) Multimedia Subsystem (IMS) Core Network Industry Requirements (IR) for Next Generation Network (NGN) Government Emergency Telecommunications Service (GETS), Phase 1, Voice Service," Industry Requirements (IR) Document, Dec. 2007, 448 pages, Issue 1.0, National Communications System, United States of America.
Jonathan Rosenberg, et al., "SIP: Session Initiation Protocol," Network Working Group, Jun. 2002, 202 pages, The Internet Society.

* cited by examiner

Primary Examiner — Duc Nguyen
Assistant Examiner — Kile Blair

(57) ABSTRACT

A communication control system receives a call request indentifying a priority level of a calling party to establish a call from the calling party to a called party through a plurality of resources. The communication control system transfers a call setup request to setup the call the called party and receives a call rejection indicating that one of the resources is unavailable. The communication control system determines a call queue for the call based on which call queue of a plurality of call queues corresponds to the one resource and determines if the call should be placed in the call queue based on the priority level of the calling party. The plurality of call queues each correspond to a unique resource of the plurality of resources. If the call should be placed in the call queue, the communication control system places the call in the call queue.

14 Claims, 7 Drawing Sheets

PRIORITY QUEUING IN A NEXT GENERATION COMMUNICATION NETWORK

TECHNICAL BACKGROUND

Communication networks and devices sometimes may be unable to receive communications due to the volume of voice and data calls that the network or the individual device must handle. Queues are one way to deal with the calls that are unable to be terminated at the receiving end. Current queues are created at the receiving network or device. Problems arise from creating queues at the receiving network or device when the network or device is busy and cannot receive calls to even place them in a queue. If the call cannot be received and queued at the receiving network or device, then the call is dropped.

OVERVIEW

A communication control system receives a call request to establish a call from a calling party to a called party through a plurality of resources. The call request identifies a priority level of the calling party. The communication control system transfers a call setup request to setup the call the called party. The communication control system receives a call rejection indicating that a one resource of the plurality of resources is unavailable. The communication control system determines a call queue for the call based on which call queue of a plurality of call queues corresponds to the one resource. The plurality of call queues each correspond to a unique resource of the plurality of resources. The communication control system determines if the call should be placed in the call queue that corresponds to the one resource based on the priority level of the calling party. If the call should be placed in the call queue, the communication control system places the call in the call queue.

DETAILED DESCRIPTION

Figure 1:
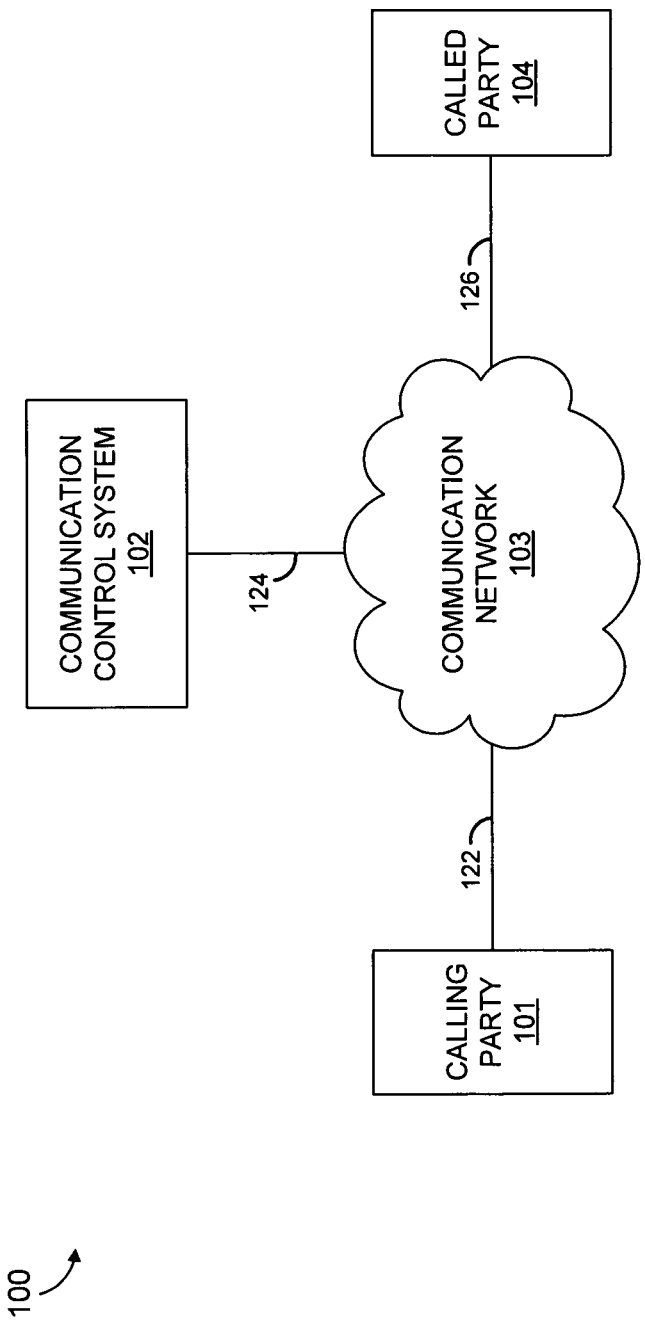
FIG. 1 is a block diagram that illustrates a communication system.

FIG. 1 is a block diagram that illustrates communication system 100. Communication system 100 comprises calling party 101, communication control system 102, communication network 103, and called party 104. Calling party 101 communicates with communication network 103 over communication link 122. Communication control system 102 communicates with communication network 103 over communication link 124. Called party 104 communicates with communication network 103 over communication link 126.

Calling party 101 comprises a communication device capable of communicating with communication control system 102 or communication network 103. Examples of calling party include mobile phones, landline phones, computers, personal digital assistants, network interface cards, or some other communication apparatus—including combinations or variations thereof.

Called party 104 comprises a communication device capable of communicating with communication control system 102 or communication network 103. Examples of calling party include mobile phones, landline phones, computers, personal digital assistants, network interface cards, or some other communication apparatus—including combinations or variations thereof.

Communication control system 102 includes a communication interface and a processing system. The communication interface comprises components that allow communication control system 102 to communicate with calling party 101, called party 104, and communication network 103. The processing system includes a storage device that stores software. The processing system also includes circuitry configured to execute the instructions of the software. The circuitry comprises a microprocessor, memory, and other circuitry that retrieves and executes the operating software from the storage device. The operating software, when executed by the processing system, directs the processing system to operate communication control system 102 as described herein.

Communication network 103 comprises any network or collection of networks, such as a time division multiplexed (TDM) network, a packet network, a wireless communication network, a public switched telephone network, an intranet, or an Internet. Communication links 122, 124, and 126 use various communication media, such as air, space, metal, optical fiber, or some other signal propagation path—including combinations thereof. Links 122, 124, and 126 use various protocols, such as Internet, telephony, optical networking, wireless communication, wireless fidelity, world wide interoperability for microwave access, global system for mobile communications, long term evolution, or some other communication format—including combinations or variations thereof. Links 122, 124, and 126 may be direct links or they may include various intermediate components, systems, and networks.

Figure 2:
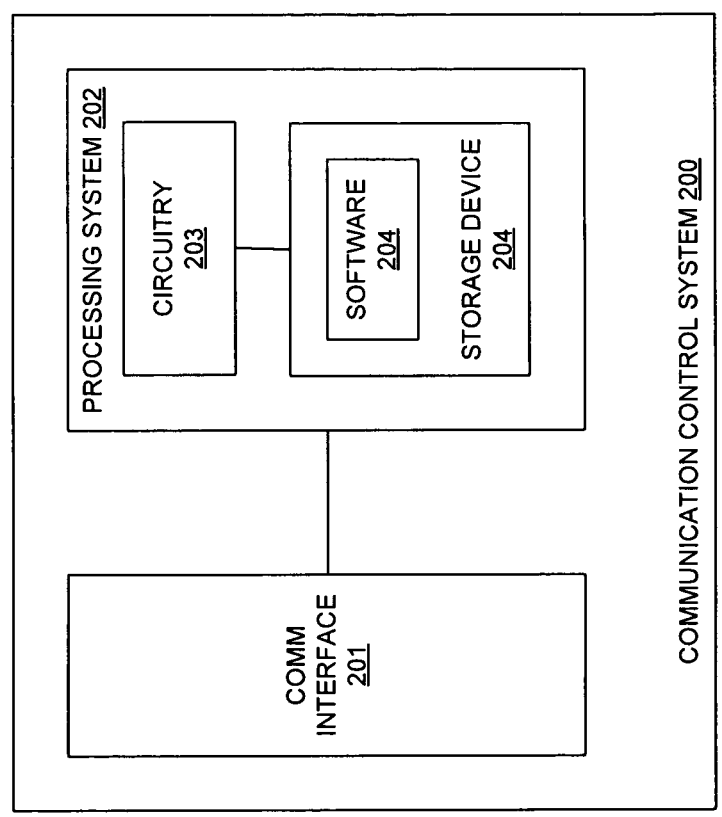
FIG. 2 is a block diagram that illustrates a communication control system.

FIG. 2 is a block diagram illustrating a communication control system 200. Communication control system 200 is an example of communication control system 102, although communication control system 102 may use alternative configurations. Communication control system 200 comprises communication interface 201 and processing system 202. Processing system 202 is linked to communication interface 201. Processing system 202 includes circuitry 203 and storage device 205 that stores operating software 205.

Communication interface 201 comprises components that communicate over link 124 under the control of processing system 202. Communication interface 201 may include a port, modem, network card, wireless transceiver, antenna, or some other communication device—as well as combinations or variations thereof. Thus, communication interface 201 would transfer and receive communications from calling party 101 and called party 104 via communication network 103.

Circuitry 203 comprises a microprocessor and other circuitry that retrieves and executes operating software 204 from storage device 205 to control communication interface 201. Storage device 205 comprises a disk drive, flash drive, memory circuitry, or some other memory device. Operating software 204 comprises computer programs, firmware, or some other form of machine-readable processing instructions. Operating software 204 may include an operating system, utilities, drivers, network interfaces, applications, or some other type of software. When executed by circuitry 203, operating software 204 directs processing system 202 to operate communication control system 200 to perform priority call queuing as described herein.

Figure 3:
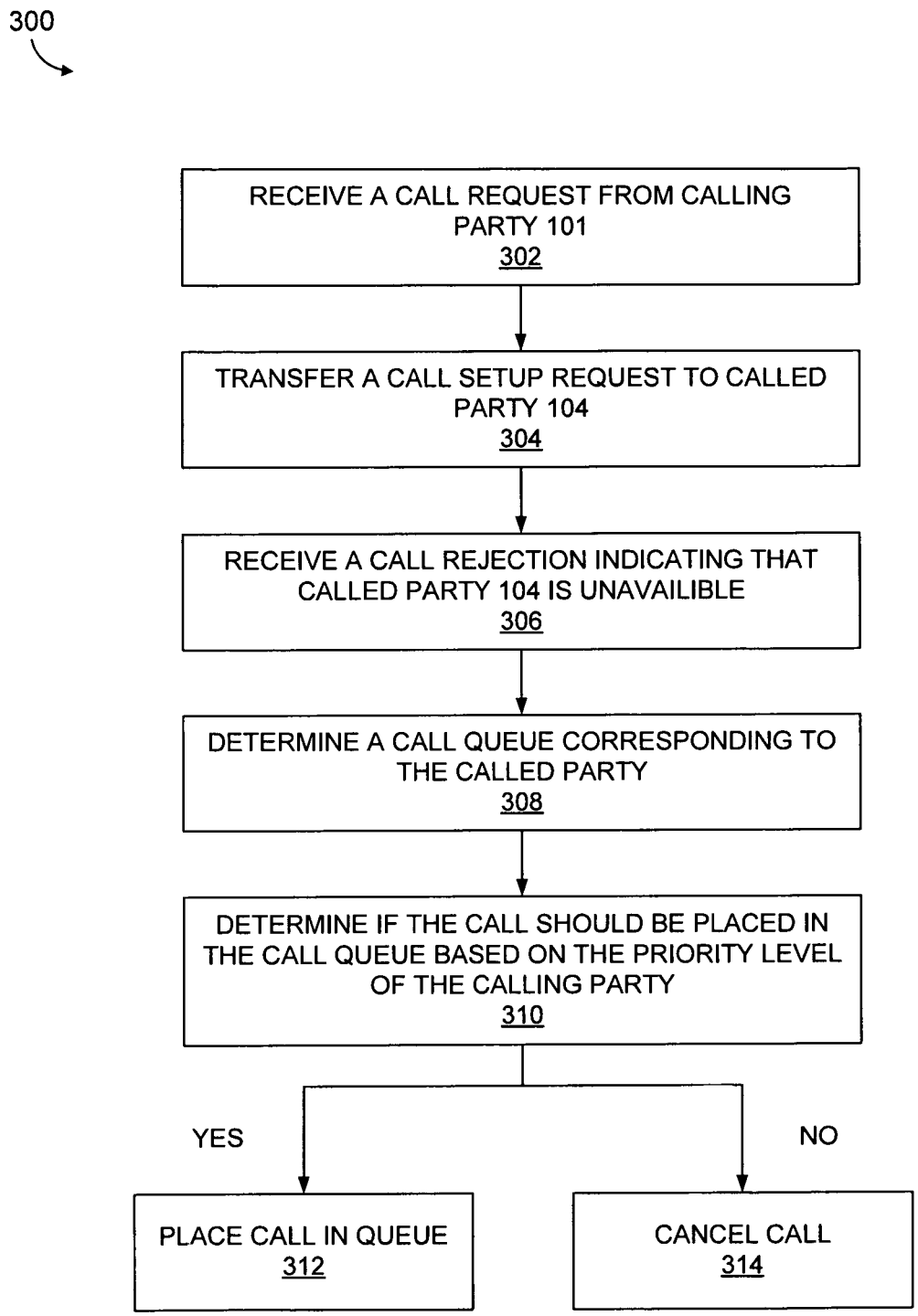
FIG. 3 is a flow diagram that illustrates priority call queuing in a communication control system.

FIG. 3 is a flow diagram that illustrates the operation of communication system 100. First, communication control system 102 receives a call request from calling party 101 (302). The call request may be a voice call, a data call, a text message, a multimedia message, or some other type of communication request. The call request includes an indication of the priority level of calling party 101. The priority level may be determined from the phone number of calling party 101, the IP address of calling party 101, a pass-code entered by calling party 101, or by some other method of identifying the priority level of a communication device. Communication control system 102 then transfers a call setup request to called party 104 (304). Called party 104 may be a wireless telephone, a landline telephone, a data server, an application server, or some other type of resource with which calling party 101 could communicate.

Communication control system 102 receives a call rejection indicating that the call cannot be terminated because a resource relating to called party 104 is unavailable (306). The call rejection indicates which resource is unavailable. Examples of resources include the line to called party 104, a communication trunk to called party 104, a base station serving called party 104, the voice call interface of called party 104, the data call interface of called party 104, or some other component that might make calling party 104 unavailable. Communication control system 102 then determines a call queue in which the call should be placed (308). The call queue is determined based on the resource that causes called party 104 to be unavailable. Thus, a separate queue is used for each resource. For example, called party 104 may be a wireless telephone. One queue is created and used for voice capabilities while another queue is created and used for data capabilities. Additionally, certain resources may not necessitate a call queue. If communication control system 102 determines that a particular resource does not necessitate a call queue, then the call is canceled.

Communication control system 102 then determines whether to place the call in the call queue based on the priority level of calling party 101 (310). Only calls of a certain priority level will be placed in the queue. The threshold priority level may be different for each queue. For example, only high priority calls are placed in a queue if the communication trunk to called party 104 is busy, but both higher and lower priority calls are placed in a queue if the line to called party 104 is busy. If the call meets the priority level required by the queue, then the call is placed in the queue (312). If the call does not meet the priority level required by the queue, then the call is canceled (314).

Figure 4:
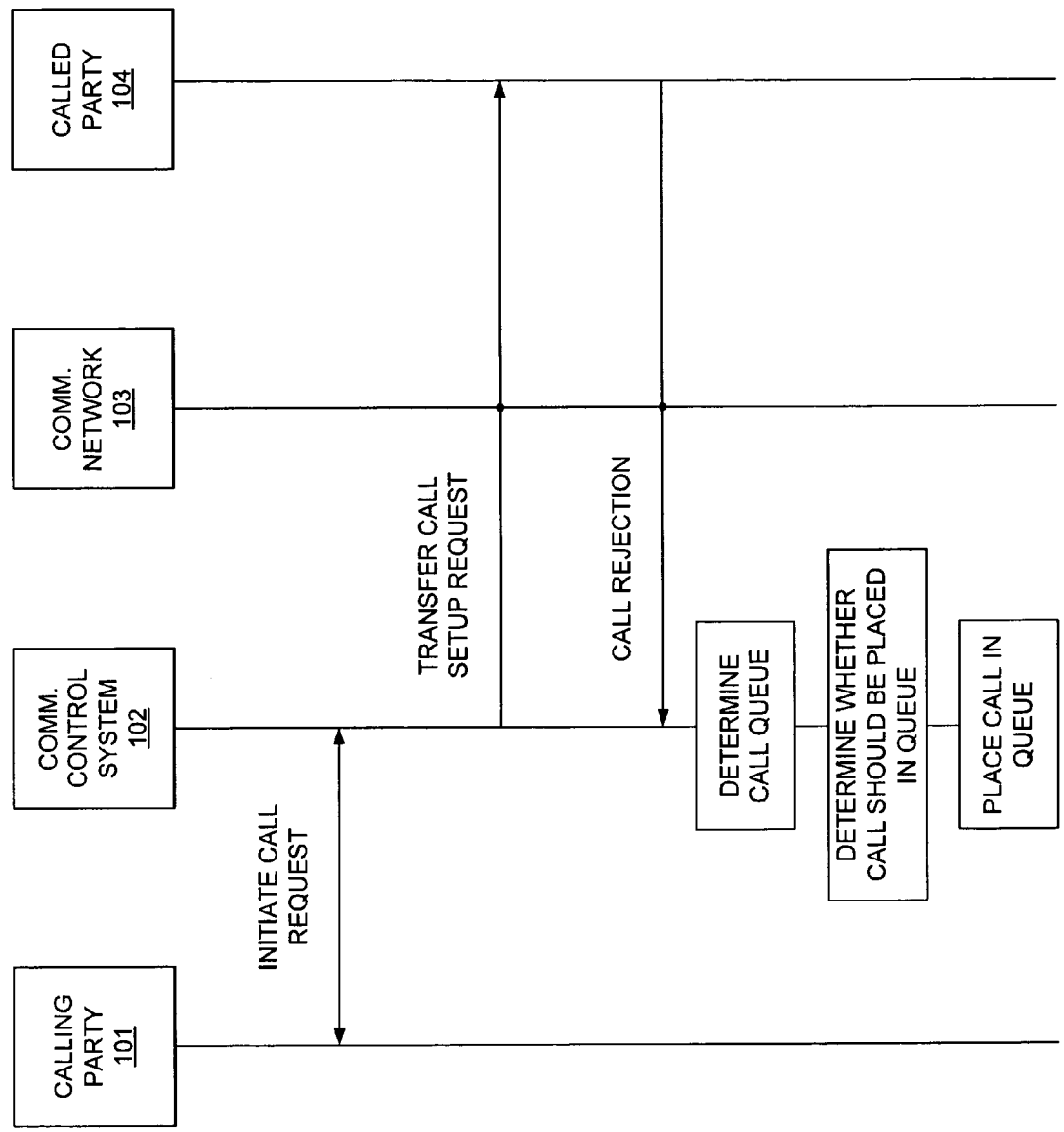
FIG. 4 is a sequence diagram that illustrates priority call queuing in a communication system.

FIG. 4 is a sequence diagram that illustrates the operation of communication system 100. First, calling party 101 initiates a call request for termination at called party 104. The call request indicates the priority level of calling party 104. Upon receiving the call request, communication control system 102 attempts to terminate the call at called party 104. If the call cannot be terminated, then control system then receives a call rejection indicating that a resource relating to called party 104 is not available. The call rejection may be received from called party 104 or from some other network element within communication network 103. For example, if called party 104 is an application server with too many instances of the application in use, then called party 104 will transmit the call rejection to communication control system 102 indicating that the application is not available. In another example, if the communication trunk leading to called party 104 is full, then a network element in communication network 103 capable of detecting trunk capacity will transmit the call rejection to communication control system 102 indicating that the trunk is not available. Communication control system 102 could be the network element.

Upon receiving the rejections message, communication control system 102 determines the correct queue in which to place the call. The queue is determined based on the resource that is unavailable. Each resource deemed to receive a queue receives a queue devoted to that single resource. If a resource requires a queue, but no calls are in a queue for that resource, then a new queue for that resource is created. Before placing the call in the queue corresponding to the unavailable resource, communication control system 102 will determine whether the call should be placed in the queue based on the priority level of the call. If the priority level of the call is not high enough to be placed in the queue, then communication control system 102 cancels the call. If the priority level is high enough to be placed in the queue, then communication control system 102 places the call in the queue. Once in the queue, calls may be sorted, for example, based on the order in which they are received or based on the priority level of the call.

Figure 5:
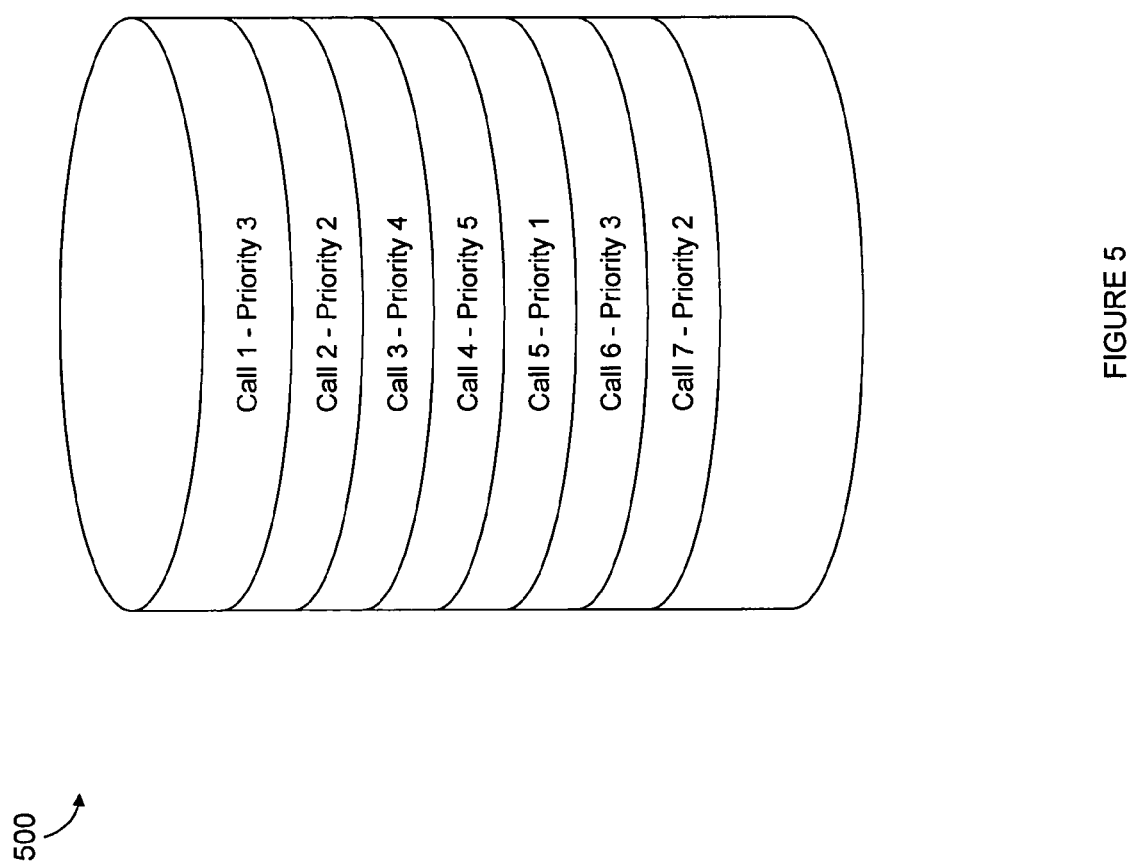
FIG. 5 is a visual representation of a call queue.

FIG. 5 is a visual representation of call queue 500 in an example of how calls are placed in a queue based on the order in which the calls are received. Call queue 500 is for a resource that accepts all priority levels from the lowest at level 1 through the highest at level 5. Call queue 500 uses a first in first out method of queuing. The first call received, call 1, is placed at the top of the queue for first removal when the resource becomes available. All subsequent calls are placed below call 1 regardless of priority level with call 7 being the last call placed into the queue.

Figure 6:
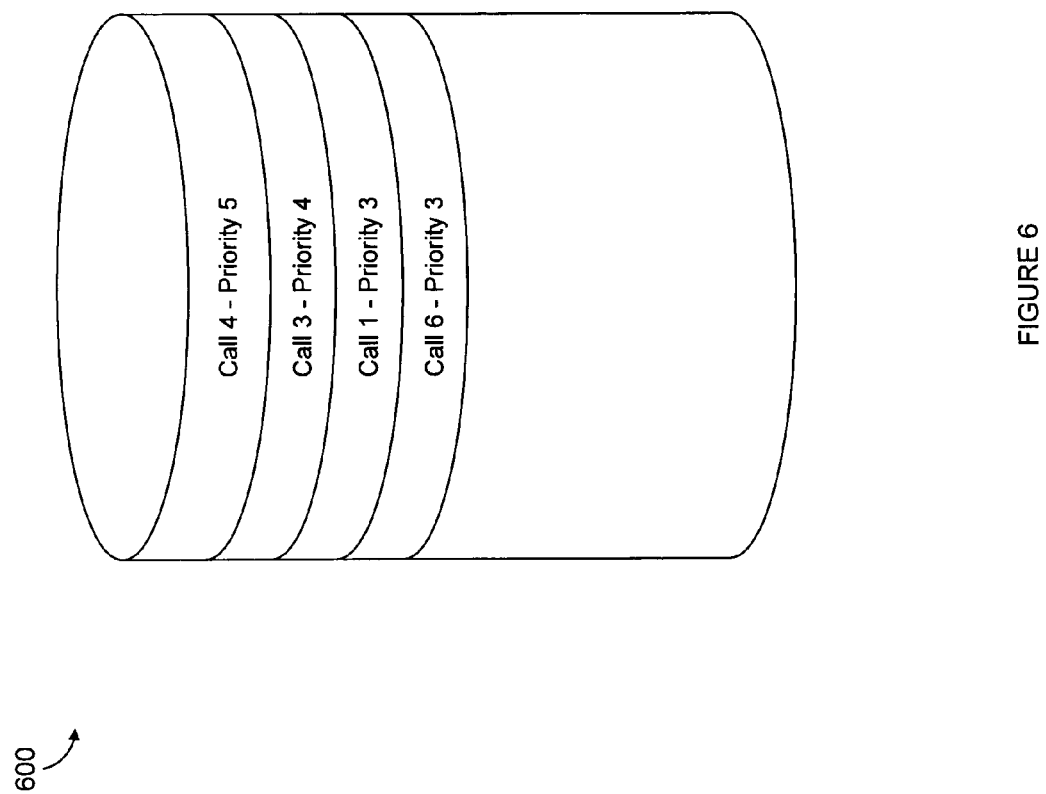
FIG. 6 is a visual representation of a call queue.

FIG. 6 is a visual representation of call queue 600 in an example of how calls are placed in a queue based on the priority level of the calls. This example uses the same calls as were used in FIG. 5. However, call queue 600 is for a resource that limits placing calls in the queue to calls with a priority level greater than or equal to priority level 3. Calls of priority level 1 and 2 are canceled and not placed in call queue 600. Therefore, call 4 with the highest priority level, level 5, is placed at the top of the call queue 600 for first removal when the resource becomes available. Call 3 with priority level 4 is the next highest priority and is placed below call 1 in call queue 600 even though call 3 was placed in the queue before call 4. Calls 1 and 6 with priority level 3 are placed below call 3 in call queue 600. Call 6 is placed in call queue 600 after call 1 because call 6 was placed in call queue 600 after call 1 and call 6 has the same priority level as call 1. Calls 2, 5, and 7 are not placed in call queue 600 because their priority level is too low.

Figure 7:
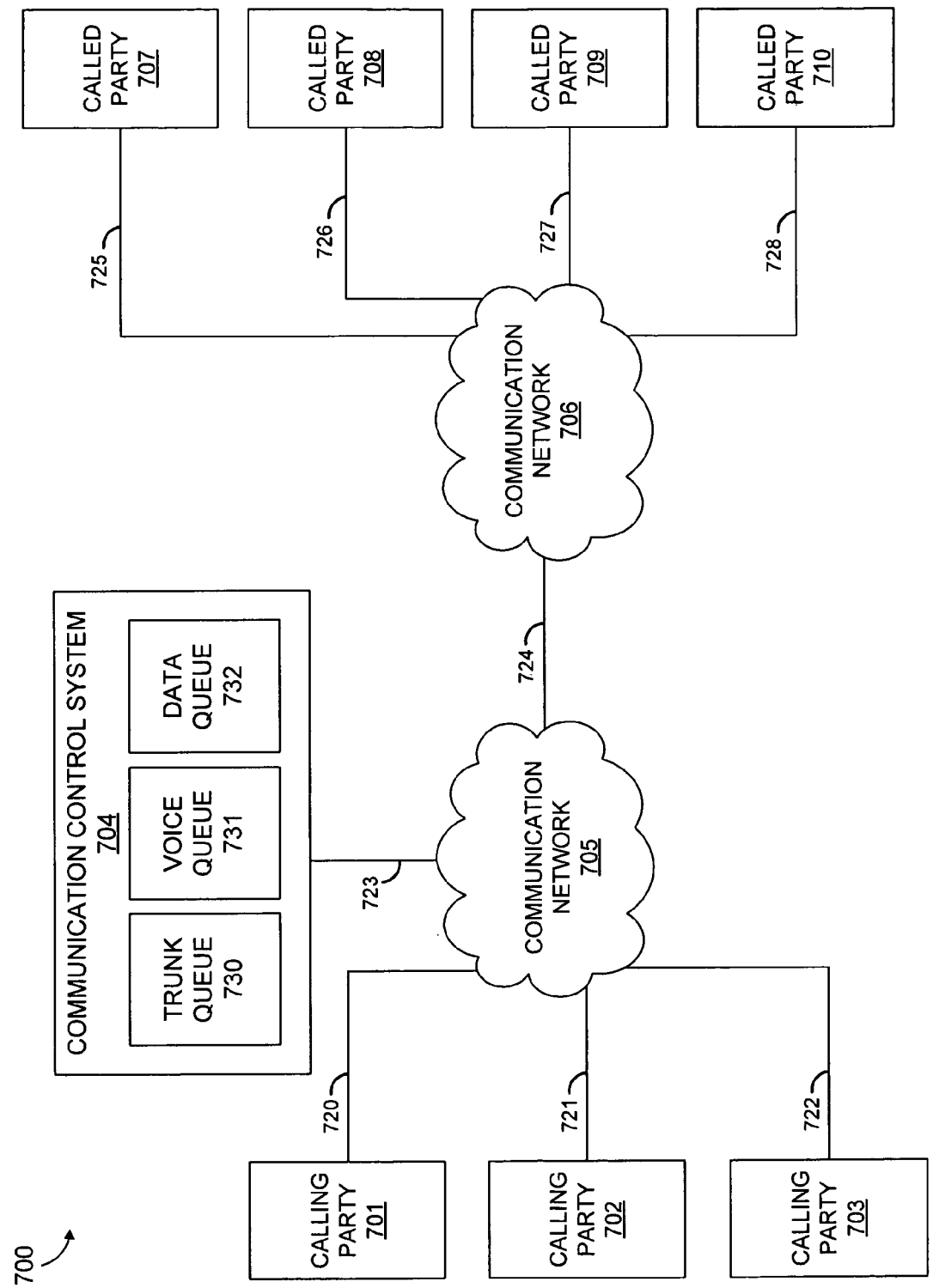
FIG. 7 is a block diagram that illustrates a communication system.

FIG. 7 is a block diagram that illustrates communication system 700. Communication system 700 comprises calling parties 701-703, communication control system 704, communication networks 705-706, and called parties 707-710. Communication control system 704 includes trunk queue 730, voice queue 731, and data queue 732. Calling parties 701-703 communicate with communication network 705 over communication links 720-722. Communication control system 704 communicates with communication network 705 over communication link 723. Communication network 705 communicates with communication network 706 over communication link 724. Called parties 707-710 communicate with communication network 706 over communication links 725-728.

Calling parties 701-703 comprise communication devices capable of communicating with communication control system 704 or communication network 705. Examples of calling party include mobile phones, landline phones, computers, personal digital assistants, music players, video players, network interface cards, or some other communication apparatus—including combinations thereof.

Called parties 707-710 comprise communication devices capable of communicating with communication control system 704, communication network 706, or communication network 705. Examples of calling party include mobile phones, landline phones, computers, personal digital assistants, music players, video players, network interface cards, or some other communication apparatus—including combinations and variations thereof.

Communication control system 704 includes a communication interface and a processing system. The communication interface comprises components that allow communication control system 704 to communicate with calling parties 701-703, called parties 707-710, communication network 705, and communication network 706. The processing system includes a storage device that stores software. The processing system also includes circuitry configured to execute the instructions of the software. The circuitry comprises a microprocessor, memory, and other circuitry that retrieves and executes the operating software from the storage device. The operating software, when executed by the processing system, directs the processing system to manage queues 730-732 and operate communication control system 102 as described herein.

Communication networks 705-706 comprise any network or collection of networks, such as a time division multiplexed (TDM) network, a packet network, a wireless communication network, a public switched telephone network, an intranet, or an Internet. Communication links 720-728 use various communication media, such as air, space, metal, optical fiber, or some other signal propagation path—including combinations thereof. Links 720-728 use various protocols, such as Internet, telephony, optical networking, wireless communication, wireless fidelity, world wide interoperability for microwave access, global system for mobile communications, long term evolution, or some other communication format—including combinations or variations thereof. Links 720-728 may be direct links or they may include various intermediate components, systems, and networks.

In operation, communication control system 704 receives a voice call request from calling party 701 indicating called party 708 as the destination. In this example, calling party 701 is a mobile telephone, called party 708 is a telephone, communication link 724 is a communication trunk line, and communication link 726 is a telephone line. The call request indicates that calling party 701 has a priority level of 3 on a scale of 1-5 with 5 being the highest priority. Communication control system 704 then transfers a call setup request to called party 708.

Communication control system 704 receives a call rejection indicating that the call cannot be terminated because a resource relating to called party 708 is unavailable. The call rejection further indicates which resource is unavailable. Communication control system 704 then determines the appropriate queue in which to place the call. If communication link 724 is the unavailable resource, then the appropriate queue is trunk queue 730. If communication link 726 is the unavailable resource, then the appropriate queue is voice queue 731. Additionally, if called party 708 is a packet-based telephone, then called party 708 could be unavailable because the phone is already on a voice call. In that case voice queue 731 would still be the appropriate call queue. Called party 708 does not have data call capabilities, therefore, data queue 732 would not be created for call rejections from called party 708.

Upon determining the appropriate queue in which to place the call, communication control system 704 determines whether the priority level of calling party 701 is high enough to place in the queue. In this example, voice queue 731 allows calls of priority level 4 or above and trunk queue 730 allows calls of 2 or above. Therefore, if voice queue 731 is the appropriate queue, then the call placed from calling party 701 with priority level 3 will not be placed in the queue because its priority level is too low. However, if trunk queue 730 is the appropriate queue, then the call placed from calling party 701 with priority level 3 will be placed in the queue because its priority level is sufficiently high.

In another example, communication control system 704 receives a data call request from calling party 702 indicating called party 709 as the destination. In this example, calling party 702 is a laptop computer, called party 709 is a computer server, communication link 724 is a communication trunk line, and communication link 727 is a data line. The call request indicates that calling party 702 has a priority level of 4 on a scale of 1-5 with 5 being the highest priority. Communication control system 704 then transfers a call setup request to called party 709.

Communication control system 704 receives a call rejection indicating that the call cannot be terminated because a resource relating to called party 709 is unavailable. The call rejection further indicates which resource is unavailable. Communication control system 704 then determines the appropriate queue in which to place the call. If communication link 724 is the unavailable resource, then the appropriate queue is trunk queue 730. If communication link 726 is the unavailable resource, then the appropriate queue is data queue 732. Additionally, called party 709 may be unavailable due to full server ports, too many processes already running on the server, a server malfunction, or for some other reason that called party 709 may be unable to receive the data call. Called party 709 does not have voice call capabilities, therefore, voice queue 731 would not be created for call rejections from called party 709.

Upon determining the appropriate queue in which to place the call, communication control system 704 determines whether the priority level of calling party 702 is high enough to place in the queue. In this example, data queue 732 allows calls of priority level 4 or above and trunk queue 730 allows calls of 2 or above. Therefore, if data queue 732 is the appropriate queue, then the call placed from calling party 702 with priority level 4 will be placed in the queue because its priority level is sufficiently high. Likewise, if trunk queue 730 is the appropriate queue, then the call placed from calling party 701 with priority level 4 will be placed in the queue because its priority level is sufficiently high.

In further examples, called parties 707-710 may be devices such as wireless phones that are capable of receiving voice and data calls. In those examples, in addition to trunk queue 730, communication control system 704 would create both voice queue 731 and data queue 732. The voice calls to the device would be placed in voice queue 731 and the data calls would be placed in data queue 732. Other examples may also create more than one trunk queue, one for data calls over the trunk and one for voice calls over the trunk.

Communication system 700 may be part of the Government Emergency Telecommunications Service (GETS) or the Next Generation Network (NGN) GETS. Both GETS and NGN GETS are services that provide priority calling for government officials. Generally, GETS is a circuit switched network while NGN GETS expands GETS to cover packet-based networks with features such as voice over Internet protocol. In this example, calling party 702 is a wireless phone used by a government official who needs to make an emergency phone call to called party 710, a VoIP telephone.

The government official dials a number on calling party 702 for calling party 702 to initiate communications with NGN GETS capable communication network 705. Once connected, the government official inputs his PIN into calling party 702, which then transmits the PIN to communication control system 704 to identify the government official as the user of calling party 702 and including the priority level of the government official. Communication control system 704 then attempts to terminate the call with called party 710. If the call cannot be terminated, then communication control system 704 receives a call rejection indicating which unavailable resource is preventing the call from terminating.

Communication control system 704 determines which call queue the call should be placed in based on the unavailable resource. In this example, the call will be placed in a voice queue corresponding to the unavailable resource because the government official is attempting to place a voice call. Thus, if communication trunk 724 is unavailable, then trunk queue 730 is the appropriate queue. If called party 710 itself is unavailable then voice queue 731 is the appropriate queue.

Communication control system 704 then determines whether the government official has a high enough priority level for his call to be placed in the appropriate call queue. If the priority level is high enough, then communication control system 704 places the call in the appropriate call queue. If the priority level is not high enough, then communication control system 704 cancels the call.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication control system, the method comprising:
   in a communication interface:
      receiving a call request to establish a call from a calling party to a called party through a plurality of resources comprising a communication line, a communication trunk line, and an application on an application server, wherein the call request identifies a priority level of the calling party;
      transferring a call setup request to setup the call to the called party;
      receiving a call rejection in response to the call setup request, wherein the call rejection indicates that a one resource of the plurality of resources is unavailable;
   in a processing device:
      determining a call queue for the call based on which call queue of a plurality of call queues corresponds to the one resource, wherein the plurality of call queues each correspond to a unique resource of the plurality of resources;
      determining if the call should be placed in the call queue that corresponds to the one resource based on the priority level of the calling party; and
      if the call should be placed in the call queue, placing the call in the call queue.

2. The method of claim 1 wherein the call is placed as part of part of a government regulated emergency telecommunications service.

3. The method of claim 1 further comprising determining the priority level from the phone number of the calling party.

4. The method of claim 1 further comprising determining the priority level from a passcode entered by the calling party.

5. The method of claim 1 further comprising determining the call queue based on the type of call.

6. The method of claim 5 wherein the call type is a voice call.

7. The method of claim 5 wherein the call type is a data call.

8. A communication control system comprising:
   an interface configured to receive a call request to establish a call from a calling party to a called party through a plurality of resources comprising a communication line, a communication trunk line, and an application on an application server, wherein the call request identifies a priority level of the calling party, transfer a call setup request to setup the call to the called party, receive a call rejection in response to the call setup request, wherein the call rejection indicates that a one resource of the plurality of resources is unavailable; and
   a processing device coupled to the interface and configured to determine a call queue for the call based on which call queue of plurality of call queues corresponds to the one resource, wherein the plurality of call queues each correspond to a unique resource of the plurality of resources, determine if the call should be placed in the call queue that corresponds to the one resource based on the priority level of the calling party, and, if the call should be placed in the call queue, place the call in the call queue.

9. The communication control system of claim 8 wherein the call is placed as part of a government regulated emergency telecommunications service.

10. The communication control system of claim 8 wherein the processing system is further configured to determine the priority level from the phone number of the calling party.

11. The communication control system of claim 8 wherein the processing system is further configured to determine the priority level from a passcode entered by the calling party.

12. The communication control system of claim 8 wherein the processing system further configured to determine the call queue based on the type of call.

13. The communication control system of claim 12 wherein the call type is a voice call.

14. The communication control system of claim 12 wherein the call type is a data call.

* * * * *